US012371764B2

(12) United States Patent
Yokota

(10) Patent No.: US 12,371,764 B2
(45) Date of Patent: Jul. 29, 2025

(54) Sm—Fe—N RARE EARTH MAGNET, PRODUCTION METHOD THEREFOR, AND RARE EARTH MAGNET POWDER

(71) Applicant: TDK Corporation, Tokyo (JP)

(72) Inventor: Hirotaka Yokota, Tokyo (JP)

(73) Assignee: TDK Corporation, Tokyo (JP)

( * ) Notice: Subject to any disclaimer, the term of this patent is extended or adjusted under 35 U.S.C. 154(b) by 602 days.

(21) Appl. No.: 17/640,096

(22) PCT Filed: Oct. 29, 2020

(86) PCT No.: PCT/JP2020/040574
§ 371 (c)(1),
(2) Date: Mar. 3, 2022

(87) PCT Pub. No.: WO2021/085521
PCT Pub. Date: May 6, 2021

(65) Prior Publication Data

US 2022/0301751 A1 Sep. 22, 2022

(30) Foreign Application Priority Data

Oct. 29, 2019 (JP) ................................ 2019-196485

(51) Int. Cl.

| | |
|---|---|
| ***H01F 1/059*** | (2006.01) |
| ***C22C 38/00*** | (2006.01) |
| ***H01F 41/02*** | (2006.01) |
| *B22F 3/16* | (2006.01) |
| *B22F 9/04* | (2006.01) |

(52) U.S. Cl.
CPC .......... *C22C 38/001* (2013.01); *C22C 38/005* (2013.01); *H01F 1/059* (2013.01); *H01F 41/0266* (2013.01); *B22F 3/16* (2013.01); *B22F 9/04* (2013.01); *B22F 2301/355* (2013.01); *B22F 2998/10* (2013.01); *C22C 2202/02* (2013.01)

(58) Field of Classification Search
CPC . C22C 38/001; C22C 38/005; C22C 2202/02; B22F 2301/355; B22F 3/16; B22F 9/04
See application file for complete search history.

(56) References Cited

U.S. PATENT DOCUMENTS

2019/0333661 A1 10/2019 Takagi et al.

FOREIGN PATENT DOCUMENTS

| | | | | |
|---|---|---|---|---|
| JP | H08-045718 | A | | 2/1996 |
| JP | 2001230111 | A | * | 8/2001 |
| JP | 2017055072 | A | * | 3/2017 |
| WO | WO-2015/198396 | A1 | | 12/2015 |
| WO | WO-2018/163967 | A1 | | 9/2018 |

OTHER PUBLICATIONS

Masashi Matsuura et al., "Increase of energy products of Zn-bonded Sm—Fe—N magnets with low oxygen content," Journal of Magnetism and Magnetic Materials, 2018, 467, p. 64-p. 68.
International Preliminary Report on Patentability issued May 12, 2022 in WO Patent Application No. PCT/JP2020/040574.

* cited by examiner

*Primary Examiner* — Anthony M Liang
(74) *Attorney, Agent, or Firm* — Faegre Drinker Biddle & Reath LLP

(57) ABSTRACT

Provided is an Sm—Fe—N rare earth magnet comprising Sm—Fe—N crystal grains. An oxygen content in the Sm—Fe—N rare earth magnet is 0.5% by mass or less on the basis of a total amount of the Sm—Fe—N rare earth magnet, and an average grain size of the Sm—Fe—N crystal grains is 1 μm or less.

4 Claims, No Drawings

Sm—Fe—N RARE EARTH MAGNET, PRODUCTION METHOD THEREFOR, AND RARE EARTH MAGNET POWDER

TECHNICAL FIELD

The present invention relates to an Sm—Fe—N rare earth magnet, a production method therefor, and a rare earth magnet powder.

BACKGROUND ART

The Sm—Fe—N rare earth magnet has a high Curie temperature, and exhibits equivalent magnet characteristics as in an Nd—Fe—B magnet, and thus improvement thereof as a magnet excellent in high heat-resistance is in progress. For example, Patent Literature 1 discloses a method for producing an Sm—Fe—N magnet molded body. In the method, an Sm—Fe—N magnet powder maintained at a predetermined temperature is compaction-molded at a predetermined molding surface pressure to obtain the Sm—Fe—N magnet molded body having a predetermined relative density.

In addition, Patent Literature 2 discloses a sintered magnet which includes a crystal phase composed of a plurality of Sm—Fe—N crystal grains, and non-magnetic metal phases existing between the Sm—Fe—N crystal grains adjacent to each other, and in which a ratio of an SmFeN peak intensity to an Fe peak intensity measured by an X-ray diffraction method is within a predetermined range.

In addition, Non Patent Literature 1 discloses a configuration in which a coarse powder containing Sm—Fe—N crystal grains with a reduced oxygen content is prepared, the coarse powder is wet-pulverized to prepare an alloy powder, and the alloy powder is sintered by plasma sintering to obtain a sintered magnet.

CITATION LIST

Patent Literature

Patent Literature 1: International Publication WO 2015/198396

Patent Literature 2: International Publication WO 2018/163967

Non Patent Literature

Non Patent Literature 1: M. Matsuura et al., J. Magn. Magn. Mater., 467, 64 (2018).

SUMMARY OF INVENTION

Technical Problem

As an index indicating magnetic characteristics of the Sm—Fe—N rare earth magnet, typically, a residual magnetic flux density (Br) and a coercive force (HcJ) are used, but there is a room for an improvement in the Sm—Fe—N magnet molded body obtained in the method disclosed in Patent Literature 1, and the sintered magnet disclosed in Patent Literature 2 and Non Patent Literature 1 from the viewpoint of the residual magnetic flux density and the coercive force.

The invention has been made in consideration of such circumstances, and an object thereof is to provide an Sm—Fe—N rare earth magnet in which a residual magnetic flux density and a coercive force are improved, a production method therefor, and a rare earth magnet powder used therein.

Solution to Problem

According to an aspect of the invention, there is provided an Sm—Fe—N rare earth magnet comprising Sm—Fe—N crystal grains. An oxygen content in the Sm—Fe—N rare earth magnet is 0.5% by mass or less on the basis of a total amount of the Sm—Fe—N rare earth magnet, and an average grain size of the Sm—Fe—N crystal grains is 1 μm or less.

Here, a carbon content in the Sm—Fe—N rare earth magnet may be greater than 0.05% by mass and equal to or less than 1.0% by mass on the basis of the total amount of the Sm—Fe—N rare earth magnet.

In addition, the rare earth magnet may not contain a non-magnetic metal phase.

in addition, a total amount of a non-magnetic metal contained in a metal phase other than the Sm—Fe—N crystal grains (excluding a non-magnetic metal contained in an oxide phase) may be 0.05% by mass or less with respect to the entirety of the rare earth magnet.

According to another aspect of the invention, there is provided an Sm—Fe—N rare earth magnet powder comprising Sm—Fe—N crystal grains.

An oxygen content in the Sm—Fe—N rare earth magnet powder is 0.5% by mass or less on the basis of a total amount of the Sm—Fe—N rare earth magnet powder.

An average grain size of the Sm—Fe—N crystal grains is 1 μm or less.

A carbon content in the Sm—Fe—N rare earth magnet powder is greater than 0.1% by mass and equal to or less than 4.5% by mass on the basis of the total amount of the Sm—Fe—N rare earth magnet powder, According to still another aspect of the invention, there is provided a method for producing an Sm—Fe—N rare earth magnet containing Sm—Fe—N crystal grains, including:

degassing and dehydrating a liquid;

pulverizing an Sm—Fe—N alloy coarse powder in the degassed and dehydrated liquid to obtain a fine powder;

molding the fine powder in a magnetic field to obtain a molded body; and sintering the molded body.

Here, an oxygen content in the fine powder may be 0.5% by mass or less, an average particle size of the fine powder may be 1 μm or less, and a carbon content in the fine powder may be greater than 0.1% by mass and equal to or less than 4.5% by mass.

Advantageous Effects of Invention

According to the invention, an Sm—Fe—N rare earth magnet in which a residual magnetic flux density and a coercive force are improved and a production method therefor are provided.

DESCRIPTION OF EMBODIMENTS

Hereinafter, a preferred embodiment of the invention will be described. However, the invention is not limited to the following embodiment.

—<Sm—Fe—N Rare Earth Magnet>

A rare earth magnet according to this embodiment is a Sm—Fe—N rare earth magnet containing Sm—Fe—N crystal grains. An oxygen content in the Sm—Fe—N rare earth magnet is 0.5% by mass or less on the basis of a total amount of the rare earth magnet, and an average grain size of the crystal grains is 1 μm or less.

The Sm—Fe—N crystal grains are crystal grains of an alloy containing Sm, Fe, and N. Examples of a crystal structure of the Sm—Fe—N crystal grains include a $TbCu_7$ type crystal and a $Th_2Zn_{17}$ type crystal. In the crystals, Sm—Fe—N crystal grains having a $Th_2Zn_{17}$ type crystal structure are preferable. Examples of the $Th_2Zn_{17}$ type crystal include $Sm_2Fe_{17}N_x$ crystal grains. X is 1 to 6, preferably 2 to 4, more preferably 2.5 to 3.5, still more preferably 2.8 to 3.2, and may be 3.

An area ratio of $Sm_2Fe_{17}N_3$ crystal grains occupying a cross-section parallel to a c-axis of the rare earth magnet according to this embodiment is preferably 85% or greater, more preferably 90% or greater, and still more preferably 95% or greater.

An average grain size of the Sm—Fe—N crystal grains is 1 μm or less. From the viewpoint that a residual magnetic flux density and a coercive force of the rare earth magnet are further improved, the average grain size is preferably 0.7 μm or less, and more preferably 0.5 μm or less. There is no limitation to the lower limit of the average grain size, but the lower limit may be, for example, 0.1 μm or 0.04 μm.

The average grain size of the Sm—Fe—N crystal grains can be measured on the basis of an observation image of a cross-section parallel to a c-axis of a sintered magnet by a SEM. That is, after obtaining cross-sectional areas of 500 Sm—Fe—N crystal grains by image analysis on the basis of the image, the respective areas are converted into a diameter of circles having the same area (an area equivalent circle diameter) to obtain a grain size distribution of the Sm—Fe—N crystal grains. A median diameter (D50) of the obtained number basis grain size distribution is obtained, and is set as an average grain size of the Sm—Fe—N crystal grains.

The rare earth magnet according to this embodiment may include a metal phase other than the Sm—Fe—N crystal grains. For example, the metal phase may be an Fe phase or the like. An area ratio of the metal phase occupying the cross-section parallel to the c-axis is preferably 10% or less, and more preferably 5% or less.

It is preferable that the rare earth magnet does not contain a non-magnet metal phase. The non-magnetic metal phase is a metal phase that contains a lot of non-magnetic metals in an atomic number ratio in comparison to a main phase (Sm—Fe—N crystal grains). Typically, since the Sm—Fe—N crystal grains contain Sm that is a non-magnetic metal in 8 to 10 atomic %, that is, 20% by mass to 25% by mass, particularly, it is preferable that the rare earth magnet does not contain a non-magnetic metal phase containing 10% by mass or greater of non-magnetic metal. The non-magnetic metal is a metal other than a ferromagnetic metal (for example, Fe, Co, Ni, and the like), and examples thereof include Zn, Al, Sn, Cu, Ti, Sm, Mo, Ru, Ta, W, Ce, La, V, Mu, and Zr, In addition, in the rare earth magnet, a metal phase other than a main phase (Sm—Fe—N crystal grains), for example, a total amount of non-magnetic metals contained in a grain boundary phase or the like (excluding a non-magnetic metal contained in an oxide phase) may be 0.05% by mass or less with respect to the entirety of rare earth magnetic.

Even in a case where the non-magnetic metal phase is not contained, the rare earth magnet may contain an oxide phase of non-magnetic metals.

An oxygen content in the rare earth magnet according to this embodiment is 0.5% by mass or less on the basis of a total amount of the rare earth magnet. From the viewpoint that the residual magnetic flux density and the coercive force are improved, the oxygen content is preferably 0.45% by mass or less. The oxygen content in the rare earth magnet can be measured by melting the rare earth magnet in a graphite crucible in an inert gas atmosphere, by causing oxygen in the rare earth magnet and carbon in the graphite crucible to react with each other to generate CO, and by detecting the amount of CO through spectral measurement by a non-dispersive infrared detector or the like.

Oxygen in a rare earth sintered magnet can exist in a grain boundary phase and/or an oxide phase.

For example, the rare earth magnet according to this embodiment may further contain at least one kind of element such as C, Al, Si, P, Ti, Cr, Mn, Co, Cu, Zn, Y, Zr, Sn, and W other than Sm, Fe, and N. The content of the elements other than Sm, Fe, and N is set to preferably 10% by mass or less, and more preferably 5% by mass or less.

A carbon content in the rare earth magnet according to this embodiment is preferably greater than 0.05% by mass and equal to or less than 1.0% by mass on the basis of the total amount of the rare earth magnet. The carbon content in the rare earth magnet may be 0.2% by mass or greater, and may be 0.6% by mass or less. At least a part of carbon can exist in the grain boundary phase.

The carbon content can be obtained by pulverizing the rare earth magnet in an agate mortar in a glove box under an inert atmosphere to obtain a powder, by combusting the powder in an oxygen stream for conversion into CO, and by quantifying CO in a combustion gas with an infrared absorption method.

A composition of the rare earth magnet according to this embodiment may be specified, for example, by an analysis method such as an energy dispersive X-ray spectroscopy (EDS) method, a fluorescent X-ray (XRF) analysis method, a high-frequency inductively coupled plasma (ICP) spectrometry, an inert gas melting-non-dispersive infrared absorption method, a combustion in an oxygen stream-infrared absorption method, and an inert gas melting-heat conductivity method.

The residual magnetic flux density Br of the rare earth magnet according to this embodiment is preferably 10.5 kG or greater, more preferably 1.0.7 kG or greater, and still more preferably 11.0 kG or greater, The residual magnetic flux density of the rare earth magnet can be measured by using a vibrating sample magnetometer (VSM) or a B—H tracer.

The coercive force Hcj of the rare earth magnet according to this embodiment is preferably 10.3 kOe or greater, more preferably 10.5 kOe or greater, and still more preferably 11.0 kOe or greater. The coercive force of the rare earth magnet represents a value measured by using the vibrating sample magnetometer (VSM) or the B—H tracer.

Dimensions and a shape of the rare earth magnet according to this embodiment are various depending on an application of the rare earth magnet, and are not particularly limited. For example, the shape of the permanent magnet may be a rectangular parallelepiped, a cube, a rectangle (plate), a polygonal column, an arc segment, a fan, an annular sector, a sphere, a disk, a circular column, a ring, or a capsule. A cross-sectional shape of the rare earth magnet may be, for example, a polygon, a circular arc (circular chord), a bow, an arch, or a circle.

The rare earth magnet according to this embodiment may be used in various fields such as a hybrid vehicle, an electric vehicle, a hard disk drive, a magnetic resonance imaging device (MRI), a smartphone, a digital camera, a thin TV, a scanner, an air conditioner, a heat pump, a refrigerator, a vacuum cleaner, a washer and dryer, an elevator, and a wind power generator. The rare earth magnet may be used as a material that constitutes a motor, a generator, or an actuator.

<Method for Producing Sm—Fe—N Rare Earth Magnet>

An example of a method for producing the Sm—Fe—N rare earth magnet (hereinafter, also referred to as “rare earth magnet”) according to this embodiment will be described.

[Sm—Fe—N Coarse Powder Preparation Process]

(Sm—Fe—N Alloy Coarse Powder)

First, an Sm—Fe—N alloy coarse powder is prepared. The Sm—Fe—N alloy coarse powder such as $Sm_2Fe_{17}N_x$ alloy is commercially available, and a production method therefor is also known. For example, the Sm—Fe—N alloy coarse powder can be obtained by nitriding an alloy coarse powder containing Sm and Fe (hereinafter, also referred to as “Sm—Fe alloy”). For example, the Sm—Fe alloy may be prepared by a calcium reduction diffusion method, a casting method, or the like.

An average particle size of the Sm—Fe—N alloy coarse powder may be 5 to 50 μm, and preferably 10 to 30 μm. The average particle size of D50 of number-basis particle size distribution obtained by a laser diffraction method.

An oxygen content of the alloy coarse powder is preferably 0.5% by mass or less, and more preferably 0.3% by mass.

[Pulverization Process]

Next, the Sm—Fe—N alloy coarse powder is pulverized (wet-pulverized) in a liquid (solvent) to obtain an alloy fine powder (Sm—Fe—N rare earth magnet powder).

In this embodiment, the Sm—Fe—N alloy coarse powder is pulverized in a degassed and dehydrated liquid (solvent) to obtain the alloy fine powder, and thus the residual magnetic flux density and the coercive force of the rare earth magnet that is obtained can be improved. The reason why the effect is obtained is not clear, but it is considered as follows. Specifically, when performing wet pulverization for pulverizing the alloy coarse powder in the liquid (solvent), an average particle size of the alloy fine powder can be made smaller in comparison to the case of performing dry pulverization. When the average particle size of the alloy fine powder is small, the coercive force of the rare earth magnet after sintering is improved. Here, when the alloy coarse powder is pulverized in a liquid (solvent) that is not treated at all, water and oxygen dissolved in the liquid (solvent) react with Fe on a surface of the alloy coarse powder and fine powder, and FeO and $Fe_2O_3$ are generated on the surface of the alloy fine powder. When sintering the alloy fine powder in which FeO and $Fe_2O_3$ are generated on the surface, FeO and $Fe_2O_3$ are reduced to Fe by Sm contained in the alloy fine powder. Fe has soft magnetism and serves as a starting point of magnetization reversal, and thus the residual magnetic flux density and the coercive force of the obtained rare earth magnet are lowered. Here, when pulverizing the alloy coarse powder in the degassed and dehydrated liquid (solvent), it is considered that oxidation of the surface of the obtained alloy fine powder is suppressed, and the residual magnetic flux density and the coercive force of the obtained rare earth magnet are improved.

The liquid (solvent) contains an organic solvent, and may contain a dispersant as necessary. It is preferable that the liquid does not contain a phosphoric acid.

Particularly, when performing wet pulverization in a liquid containing an organic solvent (solvent containing carbon atoms), or in a liquid that further contains an organic dispersant in an organic solvent, the organic solvent and/or the organic dispersant adhere to the surface of the alloy fine powder after pulverization (for example, physical absorption or chemical absorption), and it is easy to introduce the carbon atoms, particularly, a grain boundary in a rare earth magnet after sintering.

The amount of carbon atoms in the rare earth magnet after sintering can be appropriately adjusted through control of the amount of the organic solvent and the organic dispersant, the amount of carbon atoms in molecules of the organic solvent and the organic dispersant, a boiling point or a melting point of the organic solvent and the organic dispersant, pulverization conditions, and sintering conditions.

For example, the larger a ratio of carbons in the molecules of organic solvent and the organic dispersant is, the further the amount of carbon in the alloy powder and the rare earth magnet after sintering tends to increase. A ratio of carbon in molecules of the organic solvent is preferably 80% by mass or greater. A ratio of carbon in molecules of the organic dispersant is preferably 60% by mass or greater.

The higher the melting point or boiling point of the organic solvent and the organic dispersant is, the less carbon is likely to vaporize by energy during pulverization or sintering, and the more the amount of carbon in the rare earth magnet after sintering is likely to increase.

The boiling point of the organic solvent is preferably 100° C. or higher. In addition, the organic dispersant is in a liquid state at an ambient temperature, and the inciting point thereof is preferably 10° C. or higher.

The smaller the ratio of oxygen in the organic solvent and the organic dispersant molecules is, the further reaction between the Sm—Fe—N crystal grains and oxygen can be suppressed during pulverization or sintering, and the further generation of a phase of an oxide or a metal Fe can be suppressed. Accordingly, this case is preferable.

It is preferable that the organic solvent does not include a hydroxyl group because a concentration of dissolved oxygen and a concentration of moisture are likely to be reduced. As the organic solvent, for example, hydrocarbon compounds such as saturated hydrocarbons such as pentane, hexane, heptane, octane, cyclohexane, and cycloheptane, unsaturated hydrocarbons such as pentane, hexene, heptene, cyclopentane, cyclohexane, cycloheptene, 4-methylcyclohexene, and 1-methylcyclohexene, and aromatic hydrocarbons such as benzene, toluene, and xylem, and the like can be used. The organic solvent can be used alone or in combination of two or more kinds, Hydrocarbon may be a linear type, a cyclic type, or a structural isomer.

The organic solvent may be a compound containing an element other than carbon and hydrogen. Examples of the solvent include alcohols such as methanol, ethanol, butanol, propanol, hexanol, benzyl alcohol, ethylene glycol, propylene glycol, and glycerin; ethers such as diethyl ether, tetrahydrofuran, and dioxane; ketones such as acetone, methyl ethyl ketone, methyl isobutyl ketone, and cyclohexanone ketones; esters such as methyl acetate, ethyl acetate, and butyl acetate; nitrile compounds such as acetonitrile; dimethylformamides; dimethylsulfoxide; and the like.

The liquid may contain a plurality of arbitrary combinations of the above-described organic solvents.

Examples of the organic dispersant may include fatty acids or derivatives of the fatty acids. Examples of the organic dispersant include oleic acid, oleylamine, octylaminne, and the like.

Other examples of the organic dispersant may include other surfactants such as butyric acid, caproic acid, caprylic acid, capric acid, lauric acid, palmitic acid, stearic acid, oleic acid, linoleic acid, linolenic acid, capryl amine, lauryl amine, stearyl airrine, oleyl amine, ethylene diamine, aniline, and pyridine. The liquid may contain a plurality of arbitrary combinations in the above-described dispersants.

Note that, when performing the wet pulverization by using the above-described liquid, an alloy fine powder in which a carbon-containing compound adheres to a surface can be obtained, and carbon can be allowed to exist in a grain boundary of the rare earth magnet after sintering. In contrast, even when carbon exists in crystals of the alloy fine powder that becomes a raw material, it is difficult to cause carbon precipitate to the grain boundary of the rare earth magnet after sintering.

(Degassing Treatment and Dehydrating Treatment for Liquid (Solvent))

A degassing treatment is not particularly limited as long as the treatment is performed by a method capable of reducing a concentration of dissolved oxygen in a liquid (solvent), but examples thereof include a method of bubbling an inert gas in the liquid (solvent), a method of freezing and degassing the liquid (solvent), a method of brining the liquid (solvent) and an oxygen absorbing agent into contact with each other, and the like. In a case where the degassing treatment is the method of bubbling an inert gas, a bubbling time and the amount of the inert gas supplied into the liquid (solvent) may be appropriately changed depending on the concentration dissolved oxygen in the liquid (solvent) after the degassing treatment. Examples of the inert gas include nitrogen and argon, but nitrogen is preferable.

The concentration of dissolved oxygen in the liquid (solvent) after the degassing treatment is preferably 1 ppm or less, and more preferably 0.1 ppm or less from the viewpoint that the residual magnetic flux density and the coercive force of the obtained rare earth magnet that is obtained are further improved. In this specification, the concentration of dissolved oxygen in the liquid (solvent) is a value measured by a dissolved oxygen meter, and represents a mass ratio of oxygen to the total mass of the liquid (solvent).

The dehydrating treatment for the liquid (solvent) is not particularly limited as long as the treatment is performed by a method capable of reducing a concentration of moisture in the liquid (solvent), but examples thereof include a method using a drying agent, and the like. The drying agent is not particularly limited as long as moisture in the liquid (solvent) can be removed, but examples thereof include a molecular sieve and the like.

The concentration of moisture in the liquid (solvent) after the dehydrating treatment is preferably 10 ppm or less and more preferably 1 ppm or less from the viewpoint that the residual magnetic flux density and the coercive force of the rare earth magnet are further improved. In this specification, the concentration of moisture in the liquid (solvent) is a value measured by a Karl Fisher method, and represents a mass ratio of water to the total mass of the liquid (solvent).

The degassing treatment and the dehydrating treatment for the liquid (solvent) may be simultaneously performed, or after one treatment is performed, the other treatment may be performed. In addition, in a case where the liquid (solvent) contains an additive such as a dispersant other than an organic solvent, after performing the degassing treatment and the dehydrating treatment for respective components of the liquid (solvent) before mixing, the respective components may be mixed to obtain a liquid (solvent), or the degassing treatment and the dehydrating treatment may be performed for the liquid (solvent) after mixing.

In the pulverization process, for example, a pulverization method using a ball mill, a vibration mill, a mixer mill, or the like may be used. The pulverization process is preferably performed under an inert gas atmosphere from the viewpoint that the residual magnetic flux density and the coercive force of the obtained rare earth magnet are further improved. Particularly, an inert gas atmosphere in which a concentration of oxygen is 10 ppm or less is preferable. Here, the concentration of oxygen is a volume fraction. A pulverization time may be appropriately changed depending on a target average particle size of an alloy fine powder.

An average particle size of the alloy fine powder after termination of the pulverization process is preferably 1 μm or less, and more preferably 0.7 μm or less from the viewpoint that the coercive force of the rare earth magnet is further improved. The average particle size of the alloy fine powder is obtained by using an observation image of the alloy fine powder by a SEM. Specifically, after obtaining areas of 500 alloy fine powders by image analysis on the basis of the observation image, the respective areas of the fine powders are converted into a diameter of circles having the same area (an area equivalent circle diameter) to obtain a grain size distribution of the alloy fine powder. D50 of the obtained number-basis particle size distribution is set as an average particle size of the alloy fine powder. The lower limit of the average particle size of the alloy fine powder is not limited, but may be, for example, 0.1 μm or 0.04 μm. The alloy fine powder may be a single crystal of an alloy (Sm—Fe—N alloy) that substantially contains Sm, Fe, and N, and an average grain size of crystal grains of a sintered magnet can be adjusted on the basis of the average particle size of the fine powder. When the average particle size of the alloy fine powder is greater than 1 μm, a surface area decreases, and thus surface absorption of a compound containing carbon is not sufficient, and an effect of suppressing generation of a compound such as samarium oxide, iron oxide, and metallic iron during a sintering process tends to be insufficient.

The oxygen content in the alloy fine powder is preferably 0.5% by mass or less, and more preferably 0.4% by mass or less on the basis of the total amount of the alloy fine powder from the viewpoint that the residual magnetic flux density and the coercive force of the obtained rare earth magnet are further improved. When the oxygen content in the alloy fine powder is large, compounds such as samarium oxide, iron oxide, and metallic iron are likely to be generated and grown due to thermal decomposition and lattice distortion during a sintering process, and phases thereof serve as a starting point of magnetization reversal of main Phase particles and become a main factor of a decrease in the coercive force.

The carbon content in the alloy fine powder is not particularly limited, but the carbon content is preferably greater than 0.1% by mass and equal to or less than 4.5% by mass on the basis of the total amount of the alloy fine powder. The lower limit of the carbon content may be 0.2% by mass or 0.4% by mass.

A compound other than the organic solvent and the organic dispersant may exist on a surface of the alloy fine powder, but a compound containing O is preferably as small as possible.

In contrast, when carbon sufficiently exists on the surface of the alloy powder, generation of compounds such as samarium oxide, iron oxide, and metallic iron is suppressed in the sintering process. Accordingly, it is considered that generation of a starting point of magnetization reversal is suppressed, main phase particles are physically and magnetically isolated, and magnetic characteristics of the sintered magnet are improved. On the other hand, carbon excessively exists on the surface of the alloy powder, N inside the Sm—Fe—N crystal grains is replaced with C, and thus Sm—Fe—C or Sm—Fe—C—N tends to be excessively generated. Sm—Fe—C and Sm—Fe—C—N are phases having lower magnetic characteristics in comparison to Sm—Fe—N, and the residual magnetic flux density and the coercive force of the sintered magnet decrease.

When sintering an alloy fine powder in which the oxygen content is less, the particle size is small, and the carbon content is within a defined range, Sm—Fe—N rare earth magnet having high magnetic characteristics is obtained.

Note that, the oxygen content and the carbon content in the alloy powder can be measured in a similar manner as in the rare earth magnet (sintered magnet).

[Molding Process]

Next, the above-described alloy fine powder is molded in a magnetic field to obtain a molded body. It is preferable that molding is performed in a static magnetic field because a molded body in which an axis of easy magnetization of alloy particles is oriented along the static magnetic field is obtained, and an anisotropic magnet is obtained after sintering. For example, when the alloy fine powder is compressed with a mold while applying the static magnetic field to the alloy fine powder inside the mold, the molded body is Obtained. A pressure applied to the alloy fine powder by the mold may be 10 to 3000 MPa. The intensity of the magnetic field applied to the alloy fine powder may be 400 to 3000 kA/m.

[Sintering Process]

Next, the above-described molded body is sintered to obtain a sintered magnet. Sintering conditions can be appropriately set depending on a composition of a target rare earth magnet, an average particle size of the alloy fine powder, and the like. The sintering process may include a temperature raising step, and a temperature retention step subsequent to the temperature raising step, or may include only the temperature raising step. A reaching temperature in the temperature raising step may be, for example, 150° C. to 600° C. A sintering time in the temperature retention step may be five hours or shorter, or may be 0 hour.

A heating method in sintering is not particularly limited, and may be resistive heating, current carrying heating, or high-frequency heating.

In addition, heating may be performed while applying a pressure to a molded body or a sintered body in the mold.

A concentration of oxygen and a concentration of moisture in an atmosphere in the sintering process may be preferably set to 1 ppm or less, respectively, and more preferably 0.5 ppm or less, respectively. Note that, the concentration of oxygen and the concentration of moisture in the atmosphere are molar fractions.

[Cooling Process]

Next, the above-described sintered body is cooled down. The sintered body may be cooled down in an inert gas. For example, a cooling rate of the sintered body may be 5° C./minute to 100° C./minute.

Note that, from the Sm—Fe—N coarse powder preparation process to the sintering process are preferably performed in an inert gas atmosphere such as nitrogen.

[Machining Process]

A machining process of adjusting dimensions and a shape of the obtained sintered magnet by cutting, polishing, or the like may be further provided as necessary. It is preferable that the machining process is also performed in the inert gas atmosphere.

EXAMPLES

Hereinafter, the invention will be described in more detail with reference to examples, but the invention is not limited to the following examples.

Example 1

[Pulverization Process]

500 g of n-octane (organic solvent) and 10 g of oleic acid (organic dispersant) were prepared. Next, the n-octane and the oleic acid were mixed to obtain a liquid (solvent), and then nitrogen bubbling was performed in the liquid (solvent) for three hours to degas the liquid (solvent). Next, 200 g of molecular sieve 3A was added to the liquid (solvent) and the resultant liquid was left as is for one hours to dehydrate the liquid (solvent).

As an alloy coarse powder, 10 g of $Sm_2Fe_{17}N_x$ (x is approximately 3, and an average particle size D50 is approximately 25 μm) was prepared. In the alloy coarse powder, an oxygen content was 0.25% by mass and a carbon content was less than 0.01% by mass.

The alloy coarse powder was wet-pulverized in the liquid (solvent) after the degassing treatment and the dehydration treatment with a mixer mill by using zirconia beads (product name: YTZ ball, manufactured by NIKKATO CORPORATION) to obtain an alloy fine powder. The wet-pulverization was performed under a nitrogen atmosphere in which a concentration of oxygen is 5 ppm until an average particle size of the alloy fine powder reached a value shown in Table 1.

[Molding Process]

The obtained alloy fine powder was fed into a mold. The alloy fine powder was compressed by the mold while applying a static magnetic field to the alloy fine powder inside the mold, thereby obtaining a molded body. A pressure applied to the alloy fine powder was set to 1.2 GPa, and the intensity of the applied static magnetic field was set to 2500 kA/m.

[Sintering Process]

The obtained molded body was heated to 500° C. under a nitrogen atmosphere while compressing the mold at 1.2 GPa, and after reaching 500° C., the molded body was cooled down to obtain a sintered magnet. A concentration of oxygen contained in the nitrogen atmosphere in the sintering process was set to a value shown in Table 1. The concentration of oxygen was measured by a zirconia type oxygen concentration meter.

Note that, all of the processes were performed in a nitrogen atmosphere.

Example 2

A sintered magnet of Example 2 was obtained in a similar manner as in Example 1 except that the concentration of oxygen contained in the nitrogen atmosphere in the sintering process was changed to a value shown in Table 1.

Examples 3 and 4

Sintered magnets of Examples 3 and 4 were obtained in a similar manner as in Examples 1 and 2 except that a wet-pulverization time was lengthened and the wet pulverization was performed until an average particle size of the alloy fine powder after the pulverization process becomes a value shown in Table 1.

Comparative Examples 1 to 6

Sintered magnets of Comparative Examples 1 to 6 were obtained in a similar manner as in Example 1 except that dry pulverization was performed under a nitrogen atmosphere by using a jet mill instead of the wet pulverization with the mixer mill. An average particle size of an alloy fine powder after the dry pulverization and a concentration of oxygen contained in the nitrogen atmosphere in the sintering process in the comparative examples were set to values shown in Table 1. Note that, a combination of dry pulverization time and the concentration of oxygen in sintering was changed in each of the comparative examples.

Comparative Examples 7 to 14

Sintered magnets of Comparative Examples 7 to 14 were obtained in a similar manner as in Example 1 except that acetonitrile was used as the organic solvent instead of n-octane, the dispersant was not used, and the degassing treatment and the dehydration treatment for the liquid (solvent) were not performed. Note that, a combination of the wet pulverization time and the concentration of oxygen in sintering was changed in each of the comparative examples. An average particle size of an alloy fine powder after the wet pulverization and the concentration of oxygen contained in the nitrogen atmosphere in the sintering process in the comparative examples were set to values shown in Table 1.

Comparative Examples 15 to 18

Comparative Examples 15 to 18 were similar to Comparative Examples 7 to 10 except that the degassing treatment and the dehydration treatment for the liquid were performed. An average particle size of an alloy fine powder after the wet pulverization and the concentration of oxygen contained in the nitrogen atmosphere in the sintering process in the comparative examples were set to values shown in Table 1, thereby obtaining sintered magnets of Comparative Examples 15 to 18.

Examples 101

A sintered magnet of Example 101 was obtained in a similar manner as in Example 1 except that acetonitrile was used as the organic solvent instead of n-octane, and the dispersant was not used.

Examples 102 and 103

Sintered magnets of Examples 102 and 103 were obtained in a similar manner as in Example 1 except that capric acid and lauric acid were used as the organic dispersant in this order instead of oleic acid.

Example 104

A sintered magnet of Example 104 was obtained in a similar manner as in Example 1 except that n-dodecane was used as the organic solvent instead of n-octane, and stearic acid was used as the organic dispersant instead of oleic acid.

Examples 105 to 108

Sintered magnets of Examples 105 to 108 were obtained in a similar manner as in Examples 101 to 104 except that the concentration of oxygen in sintering was set to 0.5 ppm.

Examples 109 to 112

Sintered magnets of Examples 109 to 112 were obtained in a similar manner as in Examples 101 to 104 except that the wet pulverization times were lengthened to reduce the particle size.

Examples 113 to 116

Sintered magnets of Examples 113 to 116 were obtained in a similar manner as in Examples 109 to 112 except that the concentration of oxygen in sintering was set to 0.5 ppm.

Example 117

A sintered magnet of Example 117 was obtained in a similar manner as in Example 3 except that octadecane was used as the organic solvent instead of n-octane, and stearic acid was used as the organic dispersant instead of oleic acid.

Example 118

A sintered magnet of Example 118 was obtained in a similar manner as in Example 4 except that octadecane was used as the organic solvent instead of n-octane, and stearic acid was used as the organic dispersant instead of oleic acid.

Comparative Example 101

A sintered magnet of Comparative Example 101 was obtained in a similar manner as in Example 103 except that the liquid was not degassed and dehydrated after adding the dispersant, and the wet pulverization time was shortened to increase the particle size.

Comparative Example 102

A sintered magnet of Comparative Example 102 was obtained in a similar manner as in Comparative Example 101 except that the concentration of oxygen in sintering was set to 0.5 ppm.

Comparative Examples 103 to 108

Sintered magnets of Comparative Examples 103 to 108 were obtained in a similar manner as in Comparative Examples 101 and 102 except that the wet pulverization time was changed to sequentially reduce the particle size.

Comparative Examples 109 to 112

Sintered magnets of Comparative Examples 109 to 112 were obtained in a similar manner as in Comparative Examples 101 to 104 except that the liquid was degassed and dehydrated after adding the dispersant.

Comparative Examples 113 to 124

Sintered magnets of Comparative Examples 113 to 124 were obtained in a similar manner as in Comparative Examples 101 to 11$^{2}$ except that oleic acid was set as the organic dispersant.

A carbon mass fraction in molecules of the used organic solvent, a boiling point, a carbon mass fraction in molecules of the organic dispersant, and a melting point are shown in Table 1 to Table 3.

The kind of the organic solvent, a carbon mass fraction in the organic solvent molecules, a boiling point of the organic solvent, the kind of the organic dispersant, a carbon mass fraction in the organic dispersant, and a melting point of the organic dispersant are shown in Table 1 to Table

[Measurement of Average Particle Size of Alloy Fine Powder After Pulverization]

An average particle size of the alloy fine powder was obtained by using an observation image of the alloy fine powder with a SEM (product name: "SU5000", manufactured by Hitachi High-Tech Corporation). Specifically, after obtaining areas of 500 alloy fine powders by image analysis on the basis of the observation image, the areas of the fine powders were converted into a diameter of circles having the same area (an area equivalent circle diameter) to measure a particle size distribution of the alloy fine powders. D50 of the measured number basis particle size distribution was set as an average particle size of the alloy fine powder. Results are shown in Table 1 to Table 3.

[Measurement of Average Grain Size of $Sm_2Fe_{17}N_3$ Crystal Grains in Sintered Magnet]

An average grain size of $Sm_2Fe_{17}N_3$ crystal grains in a sintered magnet was measured by using an observation image of a cross-section parallel to a c-axis with a TEM (product name: "Titan", manufactured by FEI Company). That is, after obtaining areas of 500 $Sm_2Fe_{17}N_3$ crystal grains by image analysis on the basis of the image, the respective areas were converted into a diameter of circles having the same area (an area equivalent circle diameter) to obtain a grain size distribution of the $Sm_2Fe_{17}N_3$ crystal grains. 1.50 of the obtained number basis grain size distribution was set as an average grain size of the $Sm_2Fe_{17}N_3$ crystal grains. Results are shown in Table 4 to Table 6.

[Measurement of Oxygen Content in Alloy Powder and Sintered Magnet]

An oxygen content in an alloy coarse powder, an alloy fine powder, and a sintered magnet was obtained by an oxygen-in-metal analyzer. Specifically, each of the alloy coarse powder, the alloy fine powder, and the sintered magnet was melted in a graphite crucible to gasify oxygen in the alloy fine powder (into CO), and CO was detected and quantified by a non-dispersive infrared detector. Results are shown in Table 1 to Table 6.

[Measurement of Carbon Content in Alloy Powder and Sintered Magnet]

A carbon content in the alloy coarse powder, the alloy fine powder, and the sintered magnet was obtained as follows. A sample of each of the alloy coarse powder, the alloy fine powder, and the sintered magnet was pulverized in a glove box under an inert atmosphere with an agate mortar to obtain a powder, the powder was combusted in an oxygen stream into CO, and CO in a combustion gas was quantified with an infrared absorption method to obtain the carbon content. Results are shown in Table 1 to Table 6.

From observation with EDS, a non-magnetic metal phase was not confirmed in the sintered magnets of the examples, and it was confirmed that at least a part of carbon exists in a grain boundary phase. In addition, in the alloy fine powders of the examples, it was confirmed that the solvent and/or the dispersant adhered to an alloy surface. In addition, in the sintered magnet of the examples, a total amount of a non-magnetic metal contained in a metal phase other than Sm—Fe—N crystal grains (excluding a non-magnetic metal contained in an oxide phase) was 0.05% by mass or less with respect to the entirety of the rare earth magnet.

[Measurement of Magnetic Characteristics]

Magnetic characteristics of the alloy fine powders and the sintered magnets were measured by using VSM. As the magnetic characteristics, a residual magnetic flux density (Br), a coercive force (HcJ), residual magnetic polarization (Jr), and saturated magnetic polarization (Js) were measured. In addition, a degree of orientation (Jr/Js) was calculated. Note that, Br of the alloy fine powders was obtained as mass magnetization Mr (emu/g). Results are shown in Table 1 to Table 6.

[Calculation of Relative Density]

Dimensions and a mass of the obtained sintered magnets were measured to calculate a relative density of the sintered magnets with respect to a true density of $Sm_2Fe_{17}N_3$ crystals. Results are shown in Table 1 to Table 6.

TABLE 1

| | Pulverization conditions | | | | | | | | | | Alloy fine powder | | | | |
|---|---|---|---|---|---|---|---|---|---|---|---|---|---|---|---|
| | | Organic solvent | | | Organic dispersant | | | De-gassing · dehydration | Liquid | | | | | | |
| | Dry or wet | Kind | C fraction wt % | Boiling point ° C. | Kind | C fraction wt % | Melting point ° C. | Performed or not-performed | O content ppm | Moisture content ppm | Particle size µm | O content wt % | C content wt % | Mr emu/g | HcJ kOe |
| Comparative Example 1 | Dry | — | — | — | — | — | — | — | — | — | 2.0 | 0.28 | <0.01 | 150 | 9.5 |
| Comparative Example 2 | Dry | — | — | — | — | — | — | — | — | — | 2.0 | 0.28 | <0.01 | 150 | 9.5 |
| Comparative Example 3 | Dry | — | — | — | — | — | — | — | — | — | 1.5 | 0.29 | <0.01 | 144 | 10.3 |
| Comparative Example 4 | Dry | — | — | — | — | — | — | — | — | — | 1.5 | 0.29 | <0.01 | 144 | 10.3 |
| Comparative Example 5 | Dry | — | — | — | — | — | — | — | — | — | 1.1 | 0.31 | <0.01 | 140 | 10.9 |
| Comparative Example 6 | Dry | — | — | — | — | — | — | — | — | — | 1.1 | 0.31 | <0.01 | 140 | 10.9 |
| Comparative Example 7 | Wet | Acetonitrile | 58.5 | 82 | — | — | — | Not-performed | 9 | 80 | 2.0 | 0.46 | 0.06 | 135 | 9.6 |
| Comparative Example 8 | Wet | Acetonitrile | 58.5 | 82 | — | — | — | Not-performed | 9 | 80 | 2.0 | 0.46 | 0.06 | 135 | 9.6 |
| Comparative | Wet | Acetonitrile | 58.5 | 82 | — | — | — | Not- | 9 | 80 | 1.5 | 0.48 | 0.08 | 127 | 10.7 |

TABLE 1-continued

| | Pulverization conditions | | | | | | | | | | Alloy fine powder | | | | |
|---|---|---|---|---|---|---|---|---|---|---|---|---|---|---|---|
| | | Organic solvent | | | Organic dispersant | | | De-gassing · dehydration | Liquid | | | | | | |
| | Dry or wet | Kind | C fraction wt % | Boiling point ° C. | Kind | C fraction wt % | Melting point ° C. | Performed or not-performed | O content ppm | Moisture content ppm | Particle size µm | O content wt % | C content wt % | Mr emu/g | HcJ kOe |
| Example 9 | | | | | | | | performed | | | | | | | |
| Comparative Example 10 | Wet | Acetonitrile | 58.5 | 82 | — | — | — | Not-performed | 9 | 80 | 1.5 | 0.48 | 0.08 | 127 | 10.7 |
| Comparative Example 11 | Wet | Acetoniirile | 58.5 | 82 | — | — | — | Not-performed | 9 | 80 | 1.0 | 0.53 | 0.1 | 121 | 11.3 |
| Comparative Example 12 | Wet | Acetonitrile | 58.5 | 82 | — | — | — | Not-performed | 9 | 80 | 1.0 | 0.53 | 0.1 | 121 | 11.3 |
| Comparative Example 13 | Wet | Acetonitrile | 58.5 | 82 | — | — | — | Not-performed | 9 | 80 | 0.7 | 0.61 | 0.2 | 115 | 12.2 |
| Comparative Example 14 | Wet | Acetonitrile | 58.5 | 82 | — | — | — | Not-performed | 9 | 80 | 0.7 | 0.61 | 0.2 | 115 | 12.2 |
| Comparative Example 15 | Wet | Acetonitrile | 58.5 | 82 | — | — | — | Performed | 0.1 | 2 | 2.0 | 0.29 | 0.06 | 146 | 9.8 |
| Comparative Example 16 | Wet | Acetonitrile | 58.5 | 82 | — | — | — | Performed | 0.1 | 2 | 2.0 | 0.29 | 0.06 | 146 | 9.8 |
| Comparative Example 17 | Wet | Acetonitrile | 58.5 | 82 | — | — | — | Performed | 0.1 | 2 | 1.5 | 0.31 | 0.08 | 145 | 11.3 |
| Comparative Example 18 | Wet | Acetonitrile | 58.5 | 82 | — | — | — | Performed | 0.1 | 2 | 1.5 | 0.31 | 0.08 | 145 | 11.3 |

TABLE 2

| | Pulverization conditions | | | | | | | | | | Alloy fine powder | | | | |
|---|---|---|---|---|---|---|---|---|---|---|---|---|---|---|---|
| | | Organic solvent | | | Organic dispersant | | | De-gassing · dehydration Performed or not-performed | Liquid | | | | | | |
| | Dry or wet | Kind | C fraction wt % | Boiling point ° C. | Kind | C fraction wt % | Melting point ° C. | | O content ppm | Moisture content ppm | Particle size μm | O content wt % | C content wt % | Mr emu/g | HcJ kOe |
| Comparative Example 101 | Wet | n-Octane | 84.1 | 125 | Lauric acid | 71.9 | 43 | Not-performed | 9 | 30 | 2.0 | 0.49 | 0.5 | 132 | 10.1 |
| Comparative Example 102 | Wet | n-Octane | 84.1 | 125 | Lauric acid | 71.9 | 43 | Not-performed | 9 | 30 | 2.0 | 0.49 | 0.5 | 132 | 10.1 |
| Comparative Example 103 | Wet | n-Octane | 84.1 | 125 | Lauric acid | 71.9 | 43 | Not-performed | 9 | 30 | 1.5 | 0.51 | 0.7 | 124 | 11.0 |
| Comparative Example 104 | Wet | n-Octane | 84.1 | 125 | Lauric acid | 71.9 | 43 | Not-performed | 9 | 30 | 1.5 | 0.51 | 0.7 | 124 | 11.0 |
| Comparative Example 105 | Wet | n-Octane | 84.1 | 125 | Lauric acid | 71.9 | 43 | Not-performed | 9 | 30 | 1.0 | 0.56 | 1.0 | 117 | 11.9 |
| Comparative Example 106 | Wet | n-Octane | 84.1 | 125 | Lauric acid | 71.9 | 43 | Not-performed | 9 | 30 | 1.0 | 0.56 | 1.0 | 117 | 11.9 |
| Comparative Example 107 | Wet | n-Octane | 84.1 | 125 | Lauric acid | 71.9 | 43 | Not-performed | 9 | 30 | 0.7 | 0.64 | 1.5 | 112 | 12.5 |
| Comparative Example 108 | Wet | n-Octane | 84.1 | 125 | Lauric acid | 71.9 | 43 | Not-performed | 9 | 30 | 0.7 | 0.64 | 1.5 | 112 | 12.5 |
| Comparative Example 109 | Wet | n-Octane | 84.1 | 125 | Lauric acid | 71.9 | 43 | Performed | 0.1 | 2 | 2.0 | 0.27 | 0.5 | 145 | 11.3 |
| Comparative Example 110 | Wet | n-Octane | 84.1 | 125 | Lauric acid | 71.9 | 43 | Performed | 0.1 | 2 | 2.0 | 0.27 | 0.5 | 145 | 11.3 |
| Comparative Example 111 | Wet | n-Octane | 84.1 | 125 | Lauric acid | 71.9 | 43 | Performed | 0.1 | 2 | 1.5 | 0.28 | 0.7 | 144 | 11.7 |
| Comparative Example 112 | Wet | n-Octane | 84.1 | 125 | Lauric acid | 71.9 | 43 | Performed | 0.1 | 2 | 1.5 | 0.28 | 0.7 | 144 | 11.7 |
| Comparative Example 113 | Wet | n-Octane | 84.1 | 125 | Oleic acid | 76.5 | 13 | Not-performed | 9 | 30 | 2.0 | 0.49 | 0.7 | 131 | 10.1 |
| Comparative Example 114 | Wet | n-Octane | 84.1 | 125 | Oleic acid | 76.5 | 13 | Not-performed | 9 | 30 | 2.0 | 0.49 | 0.7 | 131 | 10.1 |
| Comparative Example 115 | Wet | n-Octane | 84.1 | 125 | Oleic acid | 76.5 | 13 | Not-performed | 9 | 30 | 1.5 | 0.52 | 1.4 | 123 | 10.8 |
| Comparative Example 116 | Wet | n-Octane | 84.1 | 125 | Oleic acid | 76.5 | 13 | Not-performed | 9 | 30 | 1.5 | 0.52 | 1.4 | 123 | 10.8 |
| Comparative Example 117 | Wet | n-Octane | 84.1 | 125 | Oleic acid | 76.5 | 13 | Not-performed | 9 | 30 | 1.0 | 0.56 | 2.0 | 116 | 11.8 |
| Comparative Example 118 | Wet | n-Octane | 84.1 | 125 | Oleic acid | 76.5 | 13 | Not-performed | 9 | 30 | 1.0 | 0.56 | 2.0 | 116 | 11.8 |
| Comparative Example 119 | Wet | n-Octane | 84.1 | 125 | Oleic acid | 76.5 | 13 | Not-performed | 9 | 30 | 0.7 | 0.65 | 2.7 | 111 | 12.2 |
| Comparative Example 120 | Wet | n-Octane | 84.1 | 125 | Oleic acid | 76.5 | 13 | Not-performed | 9 | 30 | 0.7 | 0.65 | 2.7 | 111 | 12.2 |
| Comparative Example 121 | Wet | n-Octane | 84.1 | 125 | Oleic acid | 76.5 | 13 | Performed | 0.1 | 2 | 2.0 | 0.27 | 0.7 | 145 | 10.6 |
| Comparative Example 122 | Wet | n-Octane | 84.1 | 125 | Oleic acid | 76.5 | 13 | Performed | 0.1 | 2 | 2.0 | 0.27 | 0.7 | 145 | 10.6 |
| Comparative Example 123 | Wet | n-Octane | 84.1 | 125 | Oleic acid | 76.5 | 13 | Performed | 0.1 | 2 | 1.5 | 0.29 | 1.4 | 143 | 11.5 |
| Comparative Example 124 | Wet | n-Octane | 84.1 | 125 | Oleic acid | 76.5 | 13 | Performed | 0.1 | 2 | 1.5 | 0.29 | 1.4 | 143 | 11.5 |

TABLE 3

| | Pulverization conditions | | | | | | | | | | Alloy fine powder | | | | |
|---|---|---|---|---|---|---|---|---|---|---|---|---|---|---|---|
| | | Organic solvent | | | Organic dispersant | | | De-gassing · dehydration | Liquid | | | | | | |
| | Dry or wet | Kind | C fraction wt % | Boiling point ° C. | Kind | C fraction wt % | Melting point ° C. | Performed or not-performed | O content ppm | Moisture content ppm | Particle size µm | O content wt % | C content wt % | Mr emu/g | HcJ kOe |
| Example 101 | Wet | Acetonitrile | 58.5 | 82 | — | — | — | Performed | 0.1 | 2 | 1.0 | 0.30 | 0.1 | 129 | 12.1 |
| Example 102 | Wet | n-Octane | 84.1 | 125 | Caprylic acid | 66.6 | 17 | Performed | 0.1 | 2 | 1.0 | 0.33 | 0.5 | 134 | 12.6 |
| Example 103 | Wet | n-Octane | 84.1 | 125 | Lauric acid | 71.9 | 43 | Performed | 0.1 | 2 | 1.0 | 0.33 | 1.0 | 138 | 13.1 |
| Example 1 | Wet | n-Octane | 84.1 | 125 | Oleic acid | 76.5 | 13 | Performed | 0.1 | 2 | 1.0 | 0.33 | 2.0 | 141 | 13.2 |
| Example 104 | Wet | n-Dodecane | 84.6 | 215 | Stearic acid | 76.0 | 69 | Performed | 0.1 | 2 | 1.0 | 0.33 | 3.5 | 132 | 12.1 |
| Example 105 | Wet | Acetonitrile | 58.5 | 82 | — | — | — | Performed | 0.1 | 2 | 1.0 | 0.30 | 0.1 | 129 | 12.1 |
| Example 106 | Wet | n-Octane | 84.1 | 125 | Caprylic acid | 66.6 | 17 | Performed | 0.1 | 2 | 1.0 | 0.33 | 0.5 | 134 | 12.6 |
| Example 107 | Wet | n-Octane | 84.1 | 125 | Lauric acid | 71.9 | 43 | Performed | 0.1 | 2 | 1.0 | 0.33 | 1.0 | 138 | 13.1 |
| Example 2 | Wet | n-Octane | 84.1 | 125 | Oleic acid | 76.5 | 13 | Performed | 0.1 | 2 | 1.0 | 0.33 | 2.0 | 141 | 13.2 |
| Example 108 | Wet | n-Dodecane | 84.6 | 215 | Stearic acid | 76.0 | 69 | Performed | 0.1 | 2 | 1.0 | 0.33 | 3.5 | 132 | 12.1 |
| Example 109 | Wet | Acetonitrile | 58.5 | 82 | — | — | — | Performed | 0.1 | 2 | 0.7 | 0.36 | 0.2 | 121 | 12.8 |
| Example 110 | Wet | n-Octane | 84.1 | 125 | Caprylic acid | 66.6 | 17 | Performed | 0.1 | 2 | 0.7 | 0.39 | 0.6 | 122 | 13.3 |
| Example 111 | Wet | n-Octane | 84.1 | 125 | Lauric acid | 71.9 | 43 | Performed | 0.1 | 2 | 0.7 | 0.39 | 1.5 | 126 | 14.0 |
| Example 3 | Wet | n-Octane | 84.1 | 125 | Oleic acid | 76.5 | 13 | Performed | 0.1 | 2 | 0.7 | 0.39 | 2.7 | 127 | 14.4 |
| Example 112 | Wet | n-Dodecane | 84.6 | 215 | Stearic acid | 76.0 | 69 | Performed | 0.1 | 2 | 0.7 | 0.39 | 4.5 | 122 | 12.8 |
| Example 117 | Wet | Octadecane | 84.9 | 317 | Stearic acid | 76.0 | 69 | Performed | 0.1 | 2 | 0.7 | 0.39 | 5.0 | 118 | 12.2 |
| Example 113 | Wet | Acetonitrile | 58.5 | 82 | — | — | — | Performed | 0.1 | 2 | 0.7 | 0.36 | 0.2 | 121 | 12.8 |
| Example 114 | Wet | n-Octane | 84.1 | 125 | Caprylic acid | 66.6 | 17 | Performed | 0.1 | 2 | 0.7 | 0.39 | 0.6 | 122 | 13.3 |
| Example 115 | Wet | n-Octane | 84.1 | 125 | Lauric acid | 71.9 | 43 | Performed | 0.1 | 2 | 0.7 | 0.39 | 1.5 | 126 | 14.0 |
| Example 4 | Wet | n-Octane | 84.1 | 125 | Oleic acid | 76.5 | 13 | Performed | 0.1 | 2 | 0.7 | 0.39 | 2.7 | 127 | 14.4 |
| Example 116 | Wet | n-Dodecane | 84.6 | 215 | Stearic acid | 76.0 | 69 | Performed | 0.1 | 2 | 0.7 | 0.39 | 4.5 | 122 | 12.8 |
| Example 118 | Wet | Octadecane | 84.9 | 317 | Stearic acid | 76.0 | 69 | Performed | 0.1 | 2 | 0.7 | 0.39 | 5.0 | 118 | 12.2 |

TABLE 4

| | Sintering conditions | Sintered magnet | | | | | | | |
|---|---|---|---|---|---|---|---|---|---|
| | Concentration of oxygen ppm | Grain size µm | O content wt % | C content wt % | Relative density % | Br kG | HcJ kOe | Js kG | Jr/js % |
| Comparative Example 1 | 2.0 | 2.0 | 0.36 | <0.01 | 90.0 | 11.8 | 8.6 | 14.1 | 83.3 |
| Comparative Example 2 | 0.5 | 2.0 | 0.32 | <0.01 | 90.5 | 12.8 | 9.2 | 14.3 | 89.3 |
| Comparative Example 3 | 2.0 | 1.5 | 0.40 | <0.01 | 90.5 | 11.3 | 8.9 | 13.9 | 81.4 |
| Comparative Example 4 | 0.5 | 1.5 | 0.35 | <0.01 | 91.2 | 12.3 | 9.5 | 14.2 | 86.2 |
| Comparative Example 5 | 2.0 | 1.1 | 0.46 | <0.01 | 90.6 | 11.0 | 9.3 | 13.4 | 82.1 |
| Comparative Example 6 | 0.5 | 1.1 | 0.39 | <0.01 | 91.5 | 11.8 | 9.9 | 13.9 | 84.9 |
| Comparative Example 7 | 2.0 | 2.0 | 0.55 | 0.05 | 88.2 | 10.5 | 8.0 | 12.8 | 81.8 |
| Comparative Example 8 | 0.5 | 2.0 | 0.50 | 0.05 | 88.8 | 11.2 | 8.3 | 12.4 | 90.2 |
| Comparative Example 9 | 2.0 | 1.5 | 0.58 | 0.05 | 88.5 | 10.2 | 8.7 | 12.6 | 81.3 |
| Comparative Example 10 | 0.5 | 1.5 | 0.53 | 0.05 | 89.1 | 10.6 | 9.1 | 12.3 | 86.6 |
| Comparative Example 11 | 2.0 | 1.0 | 0.64 | 0.05 | 88.9 | 9.5 | 9.5 | 11.4 | 83.6 |
| Comparative Example 12 | 0.5 | 1.0 | 0.57 | 0.05 | 89.4 | 10.1 | 9.9 | 11.9 | 84.8 |
| Comparative Example 13 | 2.0 | 0.7 | 0.70 | 0.05 | 89.3 | 9.4 | 9.7 | 11.0 | 85.7 |
| Comparative Example 14 | 0.5 | 0.7 | 0.65 | 0.05 | 89.8 | 9.6 | 10.2 | 11.4 | 84.3 |
| Comparative Example 15 | 2.0 | 2.0 | 0.38 | 0.05 | 90.1 | 12.0 | 8.8 | 14.1 | 85.4 |
| Comparative Example 16 | 0.5 | 2.0 | 0.32 | 0.05 | 90.9 | 12.7 | 9.3 | 14.4 | 88.6 |
| Comparative Example 17 | 2.0 | 1.5 | 0.39 | 0.05 | 90.7 | 11.8 | 9.5 | 13.7 | 85.7 |
| Comparative Example 18 | 0.5 | 1.5 | 0.36 | 0.05 | 91.3 | 12.6 | 9.7 | 13.9 | 90.4 |

TABLE 5

| | Sintering conditions | Sintered magnet | | | | | | | |
|---|---|---|---|---|---|---|---|---|---|
| | Concentration of oxygen ppm | Grain size μm | O content wt % | C content wt % | Relative density % | Br kG | HcJ kOe | Js kG | Jr/Js % |
| Comparative Example 101 | 2.0 | 2.0 | 0.57 | 0.4 | 88.3 | 10.2 | 7.9 | 12.6 | 81.0 |
| Comparative Example 102 | 0.5 | 2.0 | 0.51 | 0.4 | 88.8 | 11.0 | 8.5 | 12.2 | 90.2 |
| Comparative Example 103 | 2.0 | 1.5 | 0.59 | 0.4 | 88.6 | 10.1 | 8.5 | 12.4 | 81.5 |
| Comparative Example 104 | 0.5 | 1.5 | 0.55 | 0.4 | 89.0 | 10.4 | 9.2 | 12.1 | 86.0 |
| Comparative Example 105 | 2.0 | 1.0 | 0.66 | 0.4 | 88.9 | 9.3 | 9.3 | 11.2 | 83.0 |
| Comparative Example 106 | 0.5 | 1.0 | 0.59 | 0.4 | 89.5 | 9.8 | 9.9 | 11.7 | 83.8 |
| Comparative Example 107 | 2.0 | 0.7 | 0.71 | 0.4 | 89.2 | 9.2 | 9.5 | 10.8 | 85.2 |
| Comparative Example 108 | 0.5 | 0.7 | 0.67 | 0.4 | 89.7 | 9.4 | 10.4 | 11.2 | 83.9 |
| Comparative Example 109 | 2.0 | 2.0 | 0.39 | 0.4 | 90.1 | 11.7 | 8.5 | 13.9 | 84.2 |
| Comparative Example 110 | 0.5 | 2.0 | 0.35 | 0.4 | 90.9 | 12.5 | 9.4 | 14.1 | 88.4 |
| Comparative Example 111 | 2.0 | 1.5 | 0.40 | 0.4 | 90.8 | 11.6 | 9.4 | 13.5 | 85.9 |
| Comparative Example 112 | 0.5 | 1.5 | 0.38 | 0.4 | 91.3 | 12.4 | 9.8 | 13.6 | 91.2 |
| Comparative Example 113 | 2.0 | 2.0 | 0.59 | 0.6 | 88.3 | 10.1 | 7.7 | 12.6 | 80.2 |
| Comparative Example 114 | 0.5 | 2.0 | 0.53 | 0.6 | 88.9 | 10.9 | 8.5 | 12.2 | 89.3 |
| Comparative Example 115 | 2.0 | 1.5 | 0.61 | 0.6 | 88.6 | 10.0 | 8.4 | 12.4 | 80.6 |
| Comparative Example 116 | 0.5 | 1.5 | 0.58 | 0.6 | 89.1 | 10.3 | 9.1 | 12.1 | 85.1 |
| Comparative Example 117 | 2.0 | 1.0 | 0.69 | 0.6 | 89.0 | 9.2 | 9.3 | 11.2 | 82.1 |
| Comparative Example 118 | 0.5 | 1.0 | 0.61 | 0.6 | 89.5 | 9.7 | 9.8 | 11.7 | 82.9 |
| Comparative Example 119 | 2.0 | 0.7 | 0.72 | 0.6 | 89.3 | 9.0 | 9.2 | 10.8 | 83.3 |
| Comparative Example 120 | 0.5 | 0.7 | 0.69 | 0.6 | 89.7 | 9.3 | 10.2 | 11.2 | 83.0 |
| Comparative Example 121 | 2.0 | 2.0 | 0.41 | 0.6 | 90.0 | 11.6 | 8.4 | 13.9 | 83.5 |
| Comparative Example 122 | 0.5 | 2.0 | 0.37 | 0.6 | 90.8 | 12.3 | 9.0 | 14.1 | 87.0 |
| Comparative Example 123 | 2.0 | 1.5 | 0.42 | 0.6 | 90.8 | 11.5 | 9.3 | 13.5 | 85.2 |
| Comparative Example 124 | 0.5 | 1.5 | 0.40 | 0.6 | 91.3 | 12.2 | 9.6 | 13.6 | 89.7 |

TABLE 6

| | Sintering conditions | Sintered magnet | | | | | | | |
|---|---|---|---|---|---|---|---|---|---|
| | Concentration of oxygen ppm | Grain size μm | O content wt % | C content wt % | Relative density % | Br kG | HcJ kOe | Js kG | Jr/Js % |
| Example 101 | 2.0 | 1.0 | 0.42 | 0.05 | 90.2 | 10.6 | 10.0 | 12.9 | 82.2 |
| Example 102 | 2.0 | 1.0 | 0.42 | 0.2 | 90.3 | 11.3 | 10.2 | 12.9 | 85.3 |
| Example 103 | 2.0 | 1.0 | 0.42 | 0.4 | 90.7 | 11.4 | 10.4 | 13.2 | 86.4 |
| Example 1 | 2.0 | 1.0 | 0.42 | 0.6 | 91.0 | 11.6 | 10.5 | 13.5 | 85.8 |
| Example 104 | 2.0 | 1.0 | 0.42 | 1.0 | 90.4 | 10.8 | 10.0 | 13.1 | 82.4 |
| Example 105 | 0.5 | 1.0 | 0.35 | 0.05 | 91.0 | 11.0 | 10.1 | 13.2 | 83.3 |
| Example 106 | 0.5 | 1.0 | 0.35 | 0.2 | 91.2 | 11.5 | 10.5 | 13.2 | 87.1 |
| Example 107 | 0.5 | 1.0 | 0.35 | 0.4 | 91.7 | 11.8 | 10.9 | 13.4 | 87.8 |
| Example 2 | 0.5 | 1.0 | 0.35 | 0.6 | 91.9 | 12.1 | 11.0 | 13.4 | 89.9 |
| Example 108 | 0.5 | 1.0 | 0.35 | 1.0 | 91.3 | 11.2 | 10.1 | 13.2 | 84.8 |
| Example 109 | 2.0 | 0.7 | 0.49 | 0.05 | 90.7 | 10.2 | 10.5 | 12.3 | 82.9 |
| Example 110 | 2.0 | 0.7 | 0.49 | 0.2 | 90.8 | 10.3 | 10.8 | 12.3 | 83.7 |
| Example 111 | 2.0 | 0.7 | 0.49 | 0.4 | 91.3 | 10.5 | 11.2 | 12.3 | 85.7 |
| Example 3 | 2.0 | 0.7 | 0.49 | 0.6 | 91.3 | 10.7 | 11.3 | 12.4 | 85.9 |
| Example 112 | 2.0 | 0.7 | 0.49 | 1.0 | 90.9 | 10.1 | 10.4 | 12.4 | 81.5 |
| Example 117 | 2.0 | 0.7 | 0.49 | 1.5 | 90.3 | 10.0 | 10.0 | 12.3 | 81.3 |
| Example 113 | 0.5 | 0.7 | 0.41 | 0.05 | 91.3 | 10.3 | 10.7 | 12.0 | 85.8 |
| Example 114 | 0.5 | 0.7 | 0.41 | 0.2 | 91.5 | 10.5 | 11.1 | 12.0 | 87.3 |
| Example 115 | 0.5 | 0.7 | 0.41 | 0.4 | 92.0 | 10.9 | 11.7 | 12.2 | 88.9 |
| Example 4 | 0.5 | 0.7 | 0.41 | 0.6 | 92.2 | 11.1 | 12.0 | 12.3 | 89.9 |
| Example 116 | 0.5 | 0.7 | 0.41 | 1.0 | 91.6 | 10.3 | 10.7 | 12.2 | 84.4 |
| Example 118 | 0.5 | 0.7 | 0.41 | 1.5 | 90.8 | 10.1 | 10.2 | 12.1 | 83.5 |

In the sintered magnets according to the examples in which the oxygen content is 0.5% or less, and the average grain size of the Sm—Fe—N crystal grains is 1 μm or less, it was confirmed that a high residual magnetic flux density (for example, 10 kG or greater) and a high coercive force (for example, 10 kOe or greater) are compatible with each other.

In addition, it was confirmed that when the carbon content of the sintered magnet is greater than 0.05% by mass and equal to or less than 1.0% by mass, a higher residual magnetic flux density and a high coercive force are compatible with each other.

In addition, it was confirmed that when using an Sm—Fe—N rare earth magnet powder in which the oxygen content is 0.5% by mass or less, the average particle size is 1 μm or less, and the carbon content in the Sm—Fe—N rare earth magnet powder is greater than 0.1% by mass and equal to or less than 4.5% by mass, it is easy to produce a sintered magnet in which a residual magnetic flux density and a coercive force are compatible with each other.

The invention claimed is:

1. An Sm—Fe—N rare earth magnet comprising Sm—Fe—N crystal grains, wherein an oxygen content in the Sm—Fe—N rare earth magnet is 0.5% by mass or less on the basis of a total amount of the Sm—Fe—N rare earth magnet, an average grain size of the Sm—Fe—N crystal grains is 1 μm or less, and the Sm—Fe—N rare earth magnet is a Sm—Fe—N rare earth sintered magnet.

2. The Sm—Fe—N rare earth magnet according to claim 1, wherein a carbon content in the Sm—Fe—N rare earth magnet is greater than 0.05% by mass and equal to or less than 1.0% by mass on the basis of the total amount of the Sm—Fe—N rare earth magnet.

3. The Sm—Fe—N rare earth magnet according to claim 1, wherein the Sm—Fe—N rare earth magnet does not contain a non-magnetic metal phase.

4. The Sm—Fe—N rare earth magnet according to claim 1, wherein a total amount of a non-magnetic metal contained in a metal phase other than the Sm—Fe—N crystal grains (a non-magnetic metal contained in an oxide phase is excluded from the amount) is 0.05% by mass or less with respect to the entirety of the rare earth magnet.

* * * * *